(12) United States Patent
Hong et al.

(10) Patent No.: US 9,179,257 B2
(45) Date of Patent: Nov. 3, 2015

(54) METHOD AND SYSTEM FOR DETERMINING HIGH PRECISION GEO-FENCING USING BUSINESS PROPERTY BOUNDARIES

(71) Applicant: Pitney Bowes Inc., Stamford, CT (US)

(72) Inventors: Zhenan Hong, Shelton, CT (US); Hongping Liang, Woodbridge, CT (US); Jun Zhang, Hamden, CT (US); John A Merola, Hudson, NY (US)

(73) Assignee: Pitney Bowes Inc., Stamford, CT (US)

( * ) Notice: Subject to any disclaimer, the term of this patent is extended or adjusted under 35 U.S.C. 154(b) by 108 days.

(21) Appl. No.: 13/972,241

(22) Filed: Aug. 21, 2013

(65) Prior Publication Data

US 2015/0057012 A1 Feb. 26, 2015

(51) Int. Cl.
*H04W 4/02* (2009.01)
*H04W 4/20* (2009.01)

(52) U.S. Cl.
CPC .............. *H04W 4/022* (2013.01); *H04W 4/206* (2013.01)

(58) Field of Classification Search
CPC ....... H04W 4/021; H04W 4/02; H04W 4/023; H04W 4/025; H04W 4/028; H04W 4/001; G06Q 30/0261
USPC ............... 455/456.1, 456.3; 340/12.5, 539.13
See application file for complete search history.

(56) References Cited

U.S. PATENT DOCUMENTS

| | | | |
|---|---|---|---|
| 6,392,548 B2 * | 5/2002 | Farringdon et al. | ........ 340/573.1 |
| 6,496,116 B2 | 12/2002 | Farringdon | |
| 6,721,652 B1 | 4/2004 | Sanqunetti | |
| 6,985,747 B2 | 1/2006 | Chithambaram | |
| 7,084,758 B1 | 8/2006 | Cole | |
| 7,113,130 B2 | 9/2006 | Zukowski | |
| 7,164,986 B2 | 1/2007 | Humphries | |
| 7,254,388 B2 | 8/2007 | Nam | |
| 7,492,315 B2 | 2/2009 | Verechtchiagine | |
| 7,493,211 B2 | 2/2009 | Breen | |
| 7,539,573 B2 | 5/2009 | Schwerin | |
| 7,583,972 B2 | 9/2009 | Clipsham | |
| 7,593,740 B2 | 9/2009 | Crowley | |
| 7,612,668 B2 | 11/2009 | Harvey | |
| 7,668,562 B1 | 2/2010 | Longaker | |
| 7,681,791 B1 * | 3/2010 | Beveridge | ..................... 235/385 |
| 7,697,943 B2 | 4/2010 | Jung | |
| 7,822,426 B1 | 10/2010 | Wuersch | |

(Continued)

FOREIGN PATENT DOCUMENTS

WO 2012000107 A1 1/2012

*Primary Examiner* — Kashif Siddiqui
*Assistant Examiner* — Minjung Kim
(74) *Attorney, Agent, or Firm* — Brian A. Lemm; Charles R. Malandra, Jr.; Steven J. Shapiro (57) ABSTRACT

Systems and methods for determining a high-precision geofence boundary for a business utilizing the property boundaries of a business are provided. The property boundaries for a business are obtained, and the longest diagonal of the polygon of the property is determined. This diagonal is used as a diameter to create a circle for a primary geo-fence monitoring area for the business. When a user enters the primary geo-fence monitoring area, a location updating feature of the mobile device can be activated to get the real time coordinates of the mobile device. The real time coordinates of the mobile device can then be used to accurately determine if the user is actually in the polygon of the business property.

3 Claims, 7 Drawing Sheets

(56) References Cited

U.S. PATENT DOCUMENTS

| | | |
|---|---|---|
| 7,848,765 B2 | 12/2010 | Phillips |
| 7,884,713 B1 | 2/2011 | Emigh |
| 7,920,878 B2 | 4/2011 | Clipsham |
| 7,925,525 B2 | 4/2011 | Chin |
| 7,973,707 B2 | 7/2011 | Verechtchiagine |
| 7,999,670 B2 | 8/2011 | McClellan |
| 8,018,329 B2 | 9/2011 | Morgan |
| 8,019,532 B2 | 9/2011 | Sheha |
| 8,027,692 B2 | 9/2011 | Jenkins |
| 8,031,114 B2 | 10/2011 | Kellermeier |
| 8,046,168 B2 | 10/2011 | Wang |
| 8,068,024 B1 | 11/2011 | Emigh |
| 8,155,671 B2 | 4/2012 | Wood |
| 8,164,431 B2 | 4/2012 | Morgan |
| 8,195,203 B1 | 6/2012 | Tseng |
| 8,204,513 B2 | 6/2012 | Crowley |
| RE43,545 E * | 7/2012 | Cohen ................. 455/456.3 |
| 8,217,772 B2 | 7/2012 | Morgan |
| 8,219,115 B1 | 7/2012 | Nelissen |
| 8,229,471 B1 | 7/2012 | Kirkham |
| 8,243,022 B2 | 8/2012 | Guday |
| 8,254,902 B2 | 8/2012 | Bell |
| 8,261,183 B2 | 9/2012 | Ramic |
| 8,275,361 B2 | 9/2012 | De Vries |
| 8,378,815 B1 * | 2/2013 | McNulty et al. ......... 340/539.13 |
| 2007/0176771 A1 | 8/2007 | Doyle |
| 2008/0126334 A1 | 5/2008 | Laine |
| 2008/0171559 A1 | 7/2008 | Frank |
| 2009/0005973 A1 | 1/2009 | Salo |
| 2009/0006994 A1 | 1/2009 | Forstall |
| 2009/0137222 A1 | 5/2009 | Heen |
| 2009/0140886 A1 | 6/2009 | Bender |
| 2009/0312032 A1 | 12/2009 | Bornstein |
| 2010/0017126 A1 | 1/2010 | Holcman |
| 2010/0042940 A1 | 2/2010 | Monday |
| 2010/0090827 A1 | 4/2010 | Gehrke |
| 2010/0253508 A1 | 10/2010 | Koen |
| 2011/0054780 A1 | 3/2011 | Dhanani |
| 2011/0112768 A1 * | 5/2011 | Doyle ........................ 701/300 |
| 2011/0148634 A1 | 6/2011 | Putz |
| 2011/0178701 A1 | 7/2011 | Gupta |
| 2011/0178811 A1 | 7/2011 | Sheridan |
| 2011/0231493 A1 | 9/2011 | Dyor |
| 2011/0238300 A1 | 9/2011 | Schenken |
| 2011/0250901 A1 | 10/2011 | Grainger |
| 2012/0001928 A1 | 1/2012 | Sheha |
| 2012/0046040 A1 | 2/2012 | Chatterjee |
| 2012/0054001 A1 | 3/2012 | Zivkovic |
| 2012/0066066 A1 | 3/2012 | Jain |
| 2012/0083964 A1 | 4/2012 | Montemerlo |
| 2012/0084177 A1 | 4/2012 | Tanaka |
| 2012/0115512 A1 | 5/2012 | Grainger |
| 2012/0129553 A1 | 5/2012 | Phillips |
| 2012/0172027 A1 | 7/2012 | Partheesh |
| 2012/0209768 A1 | 8/2012 | Nuzzi |
| 2012/0209773 A1 | 8/2012 | Ranganathan |
| 2012/0242511 A1 | 9/2012 | Morgan |
| 2012/0284256 A1 | 11/2012 | Mahajan |
| 2012/0310527 A1 | 12/2012 | Yariv |
| 2012/0319825 A1 * | 12/2012 | Shimy et al. ................ 340/12.5 |
| 2013/0045753 A1 | 2/2013 | Obermeyer |
| 2013/0165152 A1 * | 6/2013 | Nichols ..................... 455/456.3 |
| 2014/0273921 A1 * | 9/2014 | Li et al. ...................... 455/405 |
| 2014/0279123 A1 * | 9/2014 | Harkey et al. ............... 705/26.1 |

* cited by examiner

METHOD AND SYSTEM FOR DETERMINING HIGH PRECISION GEO-FENCING USING BUSINESS PROPERTY BOUNDARIES

FIELD OF THE INVENTION

The invention disclosed herein relates generally to location based marketing systems that utilize geofencing, marketing systems, and more particularly to a method and system for determining a high precision geofencing using business property boundaries.

BACKGROUND OF THE INVENTION

In today's highly competitive business world, maintaining current customers and obtaining new customers to grow a business are a necessity. Businesses are always looking for ways to increase revenue, and increasing its sales to customers, both current and new, through advertising plays a large part in many business's plans for growth. Advertising has shown to be an effective method to inform, persuade or remind target buyers of the business' goods, services or goodwill, with the ultimate goal being that an advertisement will result in the sale of the goods or services. Studies have confirmed that the more that an advertisement can be made relevant and timely for a particular intended recipient, the more likely that it is to be successful. Location-based service (LBS) providers allow a business to provide a location-based service, e.g., coupon, advertisements, brochures, information, etc., to customers that are both timely and relevant. For example, a smart-phone (or other networked mobile device) user may register with the LBS provider to be provided with a service when the user is in the proximity of a selected business. LBS providers can also assist a business to provide rewards for those customers that patronize the business' location on a frequent basis. When a customer physically visits the business' location and registers his visit using a networked mobile device (often referred to as electronically checking-in, the customer can earn points toward some type of reward, e.g., coupon, special offer, etc.

Geofencing is an important technology for location based service providers. A geo-fence is a virtual perimeter for specified geographic location point. When a device with location awareness ability enters or exits a geo-fence, some type of event is triggered to the device, typically via e-mail or text message. Most of the current geofencing solutions utilize a radius around a location point as the virtual perimeter to trigger events. Such radius based solutions (and other similar solutions) are simple and work well for some location based services, such as, for example, proximity marketing, e.g., sending a coupon when the device comes within a one mile radius of a store). However, such radius based solutions do not work well for many services that require high-precision geo-fence solutions. For example, a business may only want to send coupons or offers to a customer once the customer has actually entered the store, or allow a customer to check-in only when they have actually entered the store's property. The radius based geo-fence may either miss the trigger (if the radius is too small) or send a wrong trigger (if the radius is too large).

SUMMARY OF THE INVENTION

The present invention alleviates the problems described above and provides a system and method for determining a high-precision geo-fence boundary for a business utilizing the property boundaries of a business. According to embodiments of the present invention, property boundary data, which includes property polygon information for both residential and commercial properties, is used to determine the property boundaries for a business. Using this information, the longest diagonal of the polygon of the property on which a business is located is determined, and this diagonal is used as a diameter to create a circle for the primary geo-fence monitoring area for the business. Because the geo-fence radius is constructed using actual property dimensions, it alleviates the possibility of the radius being either too large or too small, increasing the effectiveness of the location based services. When a user enters the primary geo-fence monitoring area, a location updating feature of the mobile device can be activated to get the real time coordinates of the mobile device. The real time coordinates of the mobile device can then be used to accurately determine if the user is actually in the polygon of the business property.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like of corresponding parts.

DETAILED DESCRIPTION OF THE PRESENT INVENTION

Figure 1:
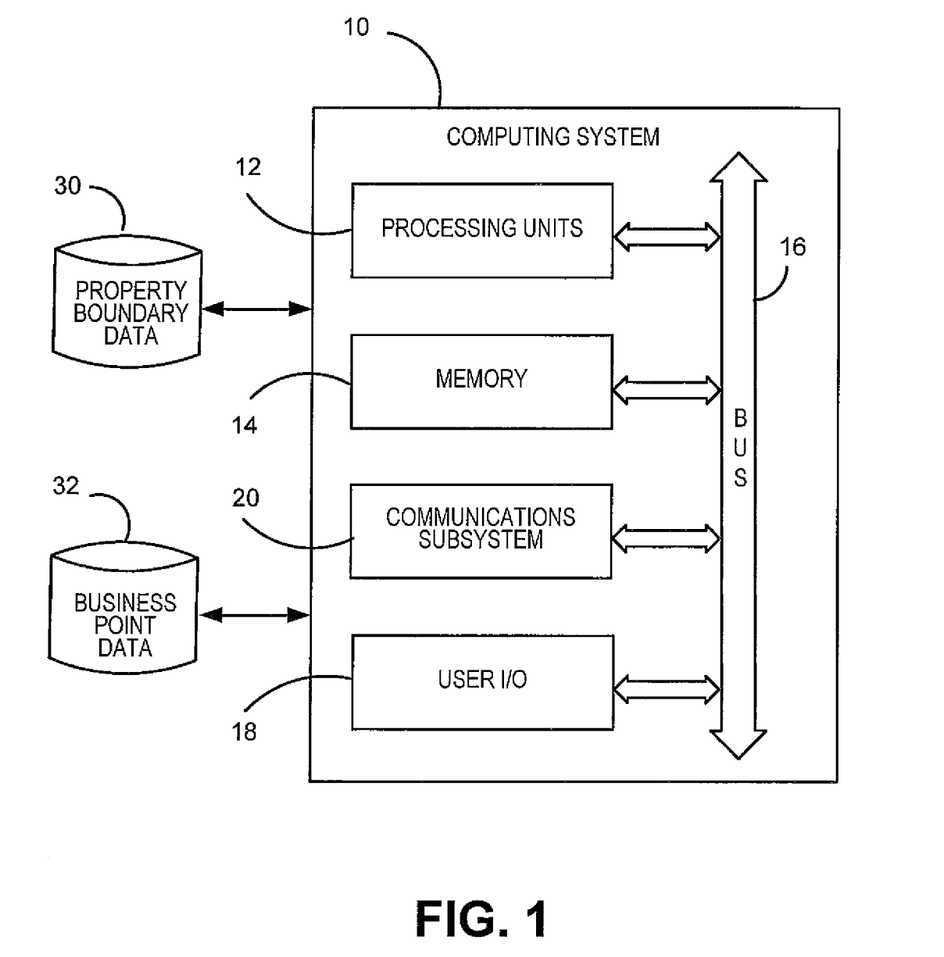
FIG. 1 illustrates a block diagram of a computing system that can execute the high-precision geofencing boundaries according to an embodiment of the present invention.

In describing the present invention, reference is made to the drawings, wherein there is seen in FIG. 1 a block diagram of a computing system 10 that can execute the high-precision geofencing boundaries according to an embodiment of the present invention. FIG. 1 and the following description are intended to provide a brief, general description of a suitable computing system 10 in which the various aspects of the present invention can be implemented. While the description provided is in the general context of computer-executable instructions that can run on one or more computers, those skilled in the art will recognize that a novel embodiment also can be implemented in combination with other program modules and/or as a combination of hardware and software.

The computing system 10 includes a processing unit(s) 12, a computer-readable storage such as a system memory 14, and a system bus 16. The processing unit(s) 12 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices. The system memory 14 can include computer-readable storage (physical storage media) such as a volatile memory (e.g., random access memory (RAM)) and non-volatile memory (e.g., ROM, EPROM, EEPROM, etc.). A basic input/output system (BIOS) can be stored in the non-volatile memory, and includes the basic routines that facilitate the communication of data and signals between components within the computing system 10, such as during startup. The volatile memory can also include a high-speed RAM such as static RAM for caching data.

The system bus 16 provides an interface for system components including, but not limited to, the system memory 14 to the processing unit(s) 12. The system bus 16 can be any of several types of bus structure that can further interconnect to a memory bus (with or without a memory controller), and a peripheral bus (e.g., PCI, PCIe, AGP, LPC, etc.), using any of a variety of commercially available bus architectures. A user can interact with the computing system 10, programs, and data using user input/output device 18 such as a keyboard and a mouse. Other user input/output devices 18 can include a microphone, an IR (infrared) remote control, a joystick, a game pad, camera recognition systems, a stylus pen, touch screen, gesture systems (e.g., eye movement, head movement, etc.), and/or the like.

The computing system 10 can operate in a networked environment (e.g., IP-based) using logical connections via a wired/wireless communications subsystem 20 to one or more networks and/or other computers. The other computers can include workstations, servers, routers, personal computers, microprocessor-based entertainment appliances, peer devices or other common network nodes, and typically include many or all of the elements described relative to the computing system 10. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

Computing system 10 has access to data stored in one or more databases 30, 32. Databases 30, 32 can be local to computing system 10 or remote and accessed via a network connection using the communications subsystem 20. Database 30 includes property boundary data, which includes parcel boundary definitions of residential and business properties. The parcel boundary definitions define a polygon formed by the parcel boundary. Such data can be obtained, for example, using the spatial database "Centrus Parcels" from Pitney Bowes" Group1 Software. Database 32 includes business point data, such as the name of a business linked with an address, and roof top coordinates (latitude/longitude) for the business. Such data can be obtained, for example, from Pitney Bowes Software Business Insight Data. The data obtained from databases 30, 32 is used to determine a high-precision geofence boundary as described below.

Figure 2:
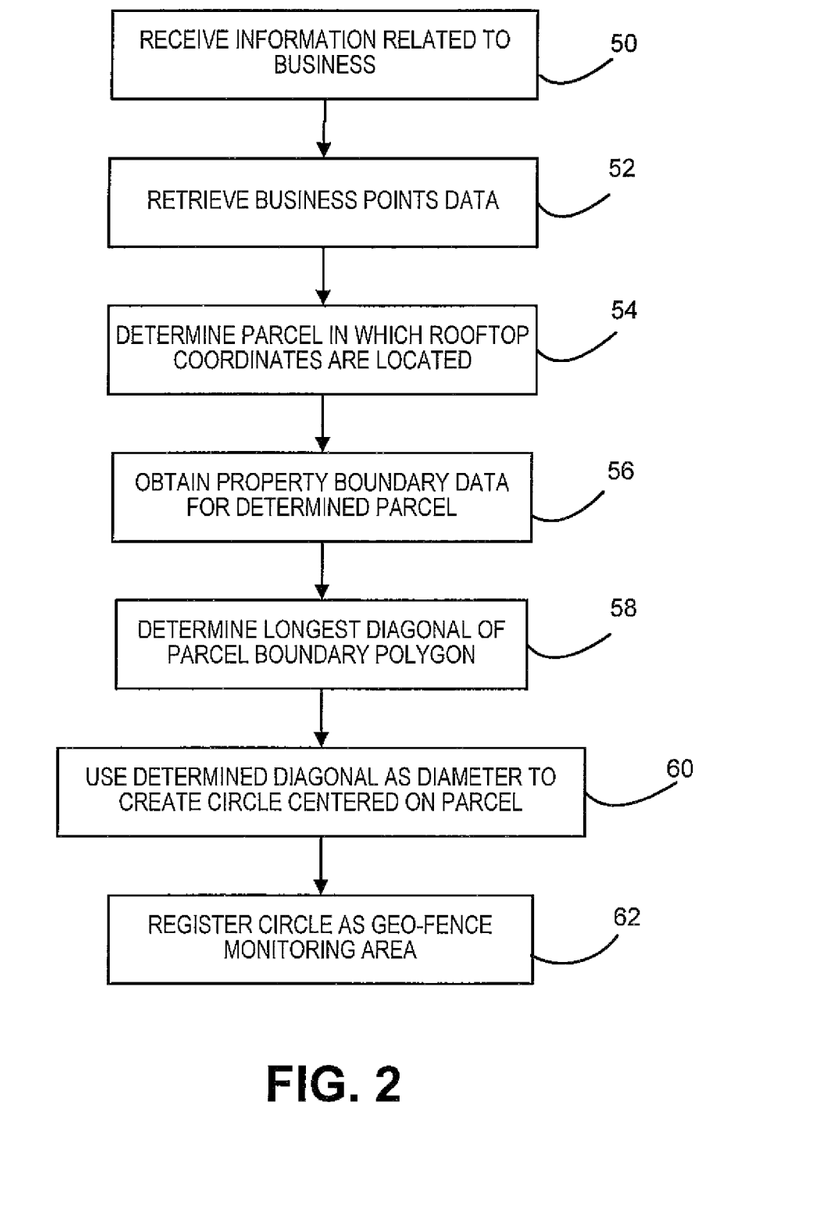
FIG. 2 illustrates in flow diagram form the processing performed to determine a primary geo-fence according to an embodiment of the present invention.
Figure 3A:
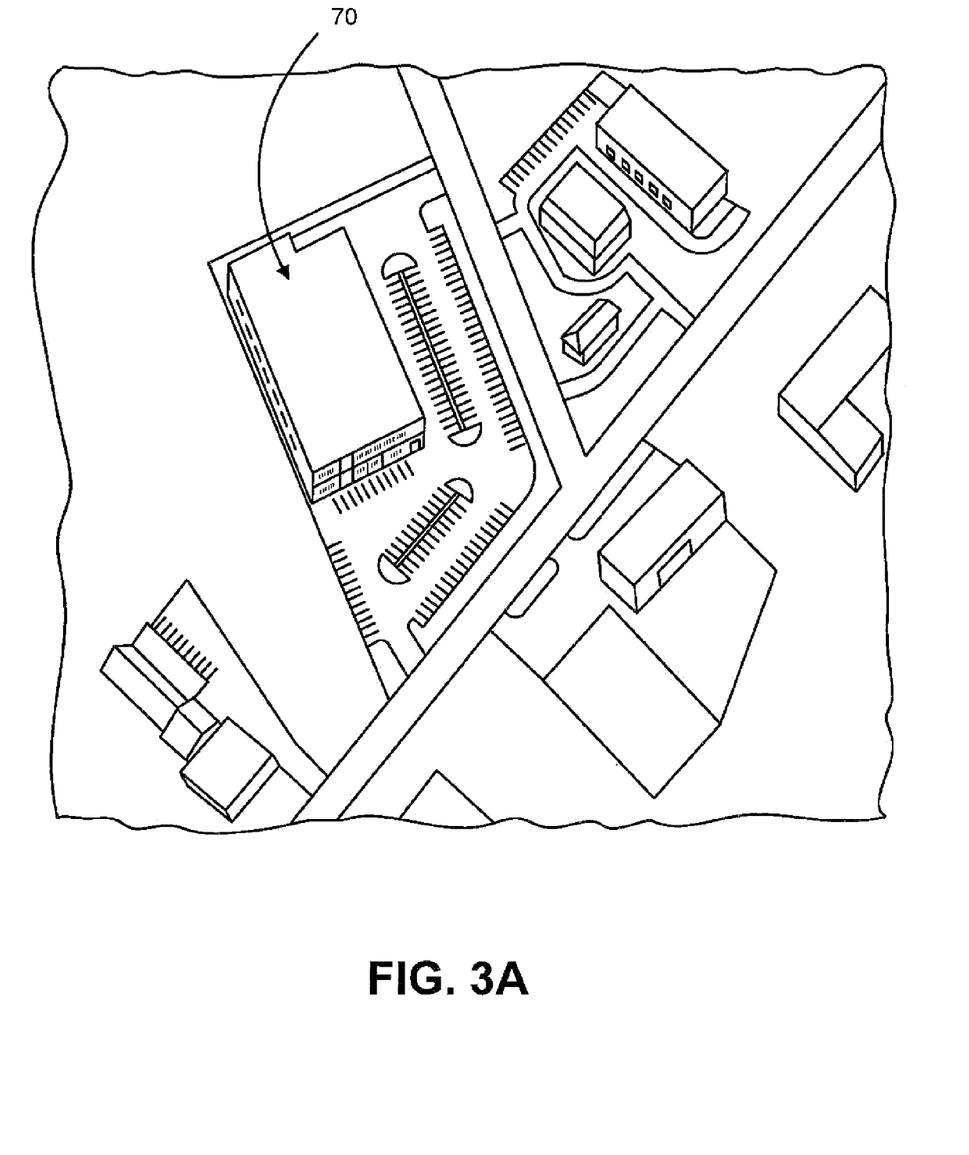
FIGS. 3A-3C illustrate an aerial view map including an example of a primary geo-fence determined according to an embodiment of the present invention.
Figure 3B:
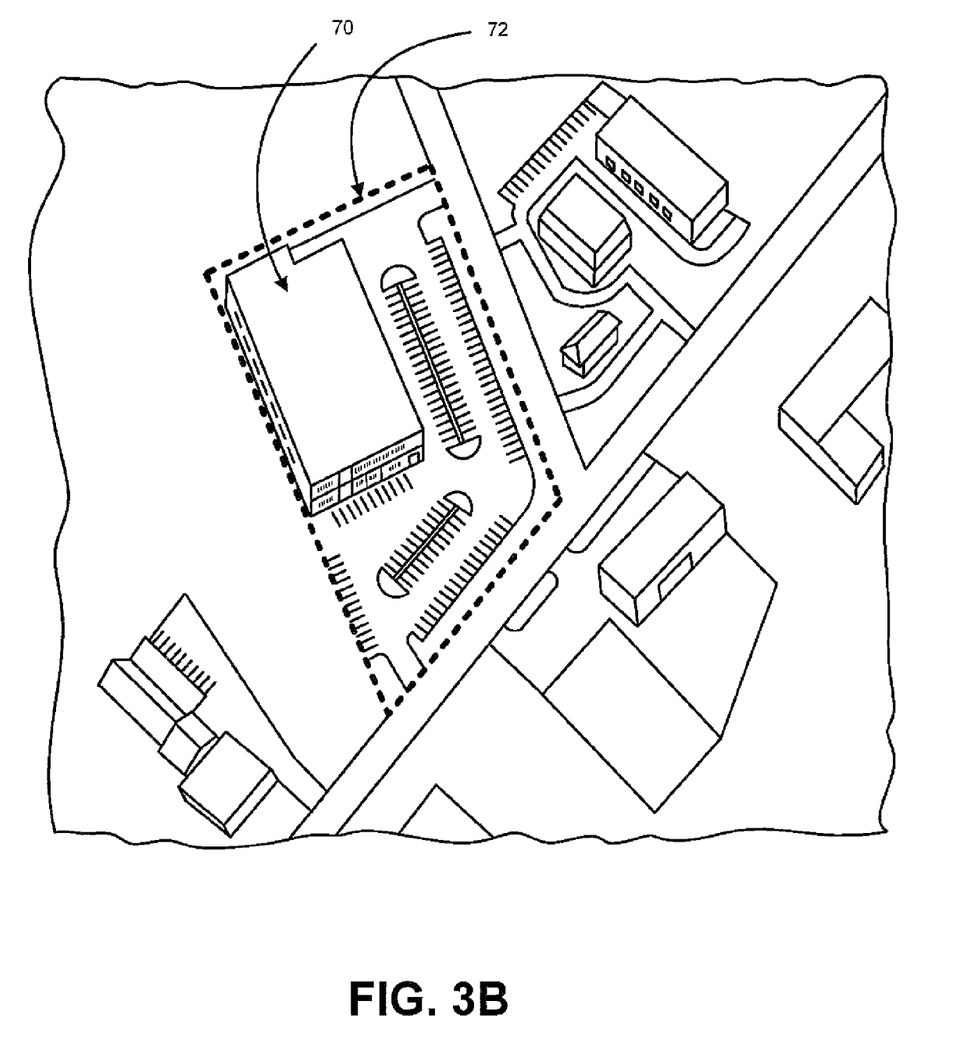

FIG. 2 illustrates in flow diagram form the processing performed by computing system 10 to determine a geo-fence according to an embodiment of the present invention. In step 50, information for a business for which a geo-fence boundary is desired to be determined is input to the computing system 10. Typically, this information can include the name and/or the address of a business or the like that desires to offer some type of location based service using a location based service provider. For example, referring to the aerial view map illustrated in FIG. 3A, the name and/or address of a business 70 can be input to the computing system 10. Business 70 desires to offer a location based service, e.g. coupon, special offer, or the like, but only to those customers that are actually on the property of the business 70. In step 52, the business point data for the information provided in step 50 is obtained from the database 32, which will include the name of the business, the business address, and the rooftop coordinates (latitude/longitude) for that business location. In step 54, using the rooftop coordinates obtained in step 52, the property parcel in which the rooftop coordinates is located is determined using, for example, a "point in polygon" search. In step 56, the property boundary data for the parcel in which the rooftop coordinates are located is obtained from the database 30. For example, as illustrated in FIG. 3B, the business 70 is located on a parcel that has the boundaries outlined by dashed line 72. At this point, the system 10 has a new dataset that describes each business with information like name and address as well as the property boundary, which can be used to setup the high-precision geofence. It should be understood that the present invention is not limited to using the business points data to obtain the property data for the parcel on which the business is located as described above, and any method that can determine the property data for the parcel can be used without departing from the scope of the present invention.

Figure 3C:
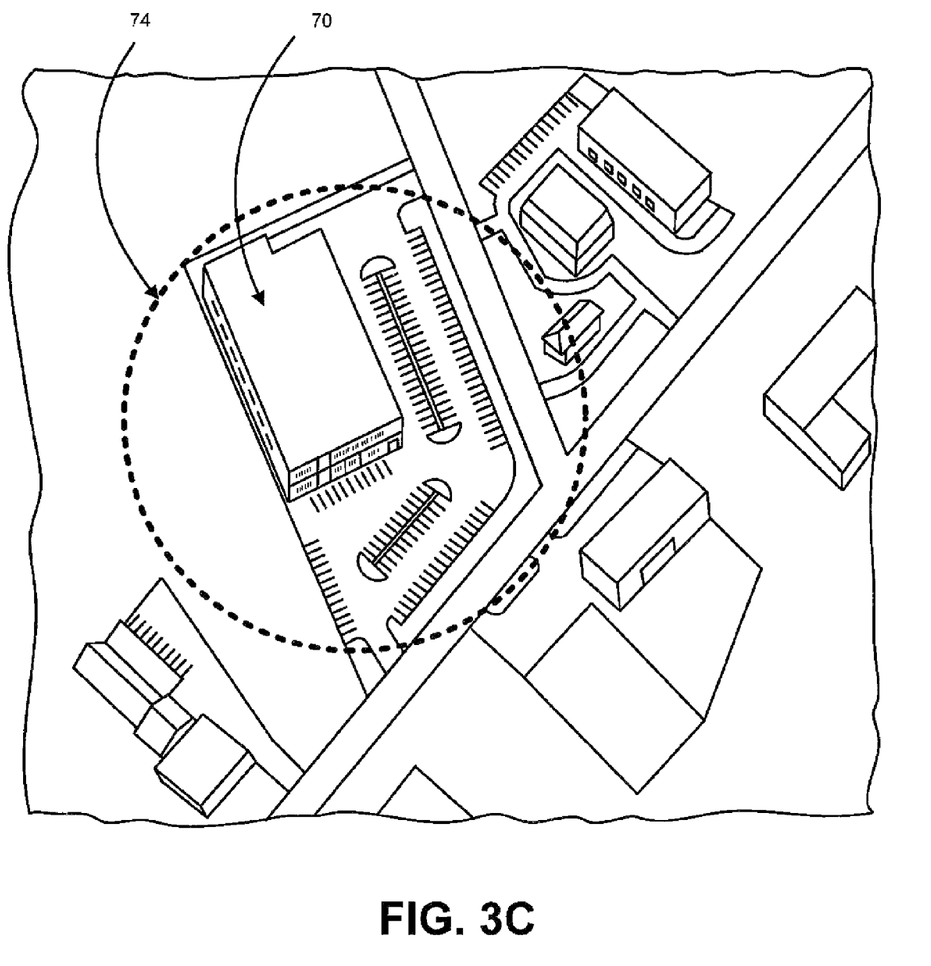

In step 58, the system 10 determines the longest diagonal of the polygon that forms the boundary of the parcel on which the business is situated. For example, for a four-sided quadrilateral, the lengths of the two diagonals are calculated and the longest diagonal is selected. In step 60, the length of the diagonal determined in step 58 is used as the diameter of a circle that is preferably centered over the parcel. The center, or centroid, of a polygon is the arithmetic mean (average) position of all the points in the polygon. In step 62 the circle is registered as the primary geo-fence monitoring area. FIG. 3C illustrates the geo-fence monitoring area designated by dashed line 74 for the business 70. The geo-fence monitoring areas can be stored, for example, in the memory 14 of computer system 10.

Figure 4:
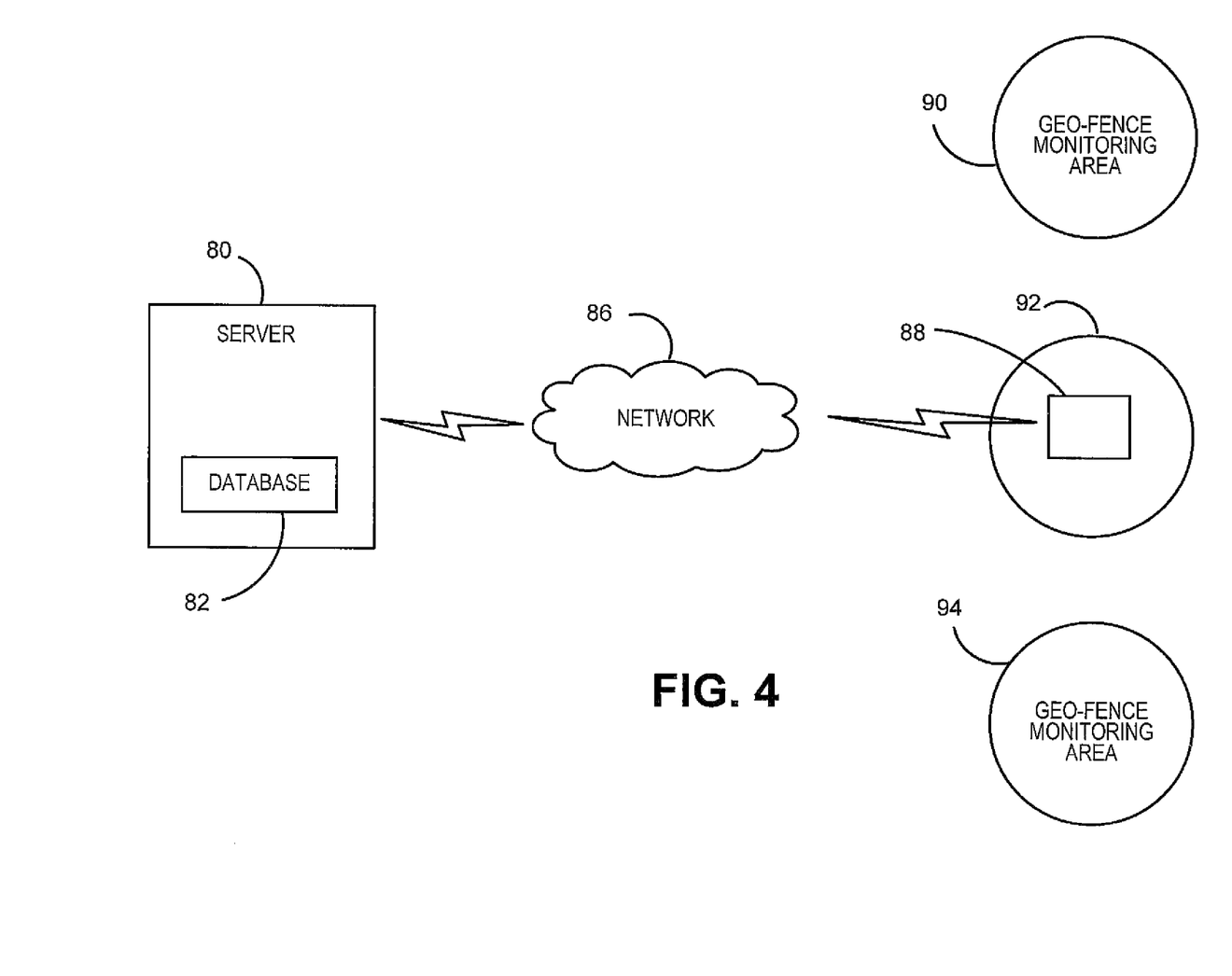
FIG. 4 illustrates in block diagram form a system that can be used to determine if the current location of a networked mobile device is within a business's property boundaries according to embodiments of the present invention.

Once the primary geo-fence monitoring area has been registered, the monitoring area can be used to determine if the current location of a networked mobile device, i.e., the user's current location, is within the actual parcel polygon for a business. FIG. 4 illustrates in block diagram form a system that can be used to determine if the current location of a networked mobile device, i.e., the user's current location, is within a business's property boundaries. The system includes a server device 80, which can be, for example, the computing system 10 as described with respect to FIG. 1 or one similar thereto. The server 80 includes a database 82, in which the registered primary geo-fence monitoring areas, determined as described above with respect to FIG. 2, are stored. Thus, for example, three different geo-fence monitoring areas 90, 92, 94 for different businesses or the like have been established and are stored in database 82. Server 80 is coupled to a network 86. Network 86 allows a networked mobile device 88 to communicate to server 80. The user of the mobile device 88 has registered with the server 80 to indicate which businesses or the like from which the user desires to receive location-based services. These user preferences can also be stored in the database 82. Thus, each user may have different preferences for different businesses. In other embodiments, one or more of the functions of the server 80 and database 82 may be included in the mobile device 88. This will allow one or more operations (as described below) to be performed locally in the mobile device 88 and save network connection bandwidth.

Figure 5:
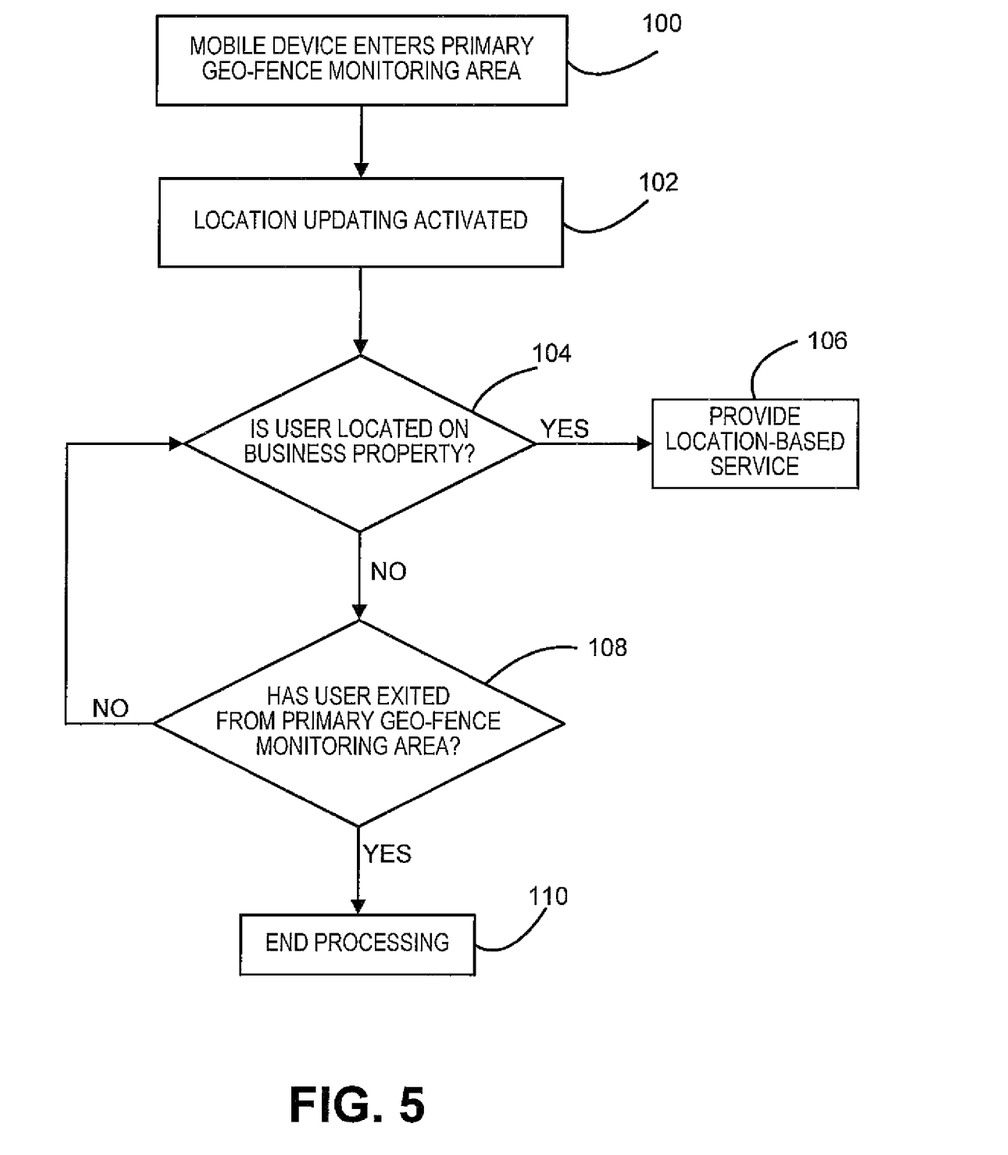
FIG. 5 illustrates in flow diagram form the processing performed by the system of FIG. 4 when using a geo-fence determined according to embodiments of the present invention.

FIG. 5 illustrates in flow diagram form the processing performed by the system of FIG. 4 according to embodiments of the present invention. It would be desirous to have the mobile device perform constant real-time location updating such that the server 80 will always know exactly where the mobile device 88 is located. This process, however, can quickly deplete the mobile device's battery charge, resulting in a less than desirable user experience. According to embodiments of the present invention, the battery usage can be minimized while still utilizing a high-precision geo-fence based on the parcel polygon of the business, i.e., the business's property boundaries. In step 100, the mobile device 88, using built-in features of the mobile device operating system, e.g., CellID or Wi-Fi address, determines where it is and sends the information to the server 80. The server 80 will determined when the mobile device 88 enters into one of the monitoring areas 90, 92, 94, for a business in which the user has registered to receive a location-based service, such as, for example, monitoring area 92 as illustrated in FIG. 4. Alternatively, if the monitoring areas for which the mobile device 88 has registered are stored in the mobile device 88, then the mobile device 88 can determine when it has entered into a monitoring area without the need to transmit its location to the server 80. Because this processing is supported by the operating system of the mobile device and does not require a separate GPS signal, there is no significant battery usage. In step 102, based on the determination that the user has entered one of the monitoring areas 90, 92, 94, location updating in the mobile device 88 is activated to get real-time coordinates of the mobile device 88, using for example, GPS signals. While this will process of using GPS signals is energy consuming, the time required for this is limited to minimize the battery usage. In step 104, it is determined if the user's current location is within the parcel polygon that was used to generate the primary geo-fence monitoring area in which the user is located, i.e., if the user is actually on the business's property. This can be performed, for example, by making a spatial query of the property boundary data using the obtained real-time coordinates of the mobile device 88. If in step 104 it is determined that the user is located on the business's property, then in step 106 the location-based service is provided by the server 80 to the user's mobile device 88.

If in step 104 it is determined that the user is not located on the business's property, then no location-based service will be provided and in step 108 it is determined if the user has exited the primary geo-fence monitoring area. If the user has exited the primary geo-fence monitoring area, the processing ends in step 110 and can start again when the user next enters another or the same primary geo-fence monitoring area. If the user has not exited the primary geo-fence monitoring area in step 108, then the processing will return to step 104 to determine if the user's current location is within the parcel polygon that was used to generate the primary geo-fence monitoring area in which the user is located, i.e., if the user is actually on the business's property. Thus, a location-based service will not be provided until it has been determined that the user's current location is actually with the property boundary of the business. The present invention therefor provides a very high-precision geo-fence that is based on the business' property boundaries while minimizing the battery consumption of the mobile device.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for determining a geo-fence monitoring area for a business, the method comprising:
   receiving, by a processing device, an address for the business;
   obtaining, by the processing device, rooftop coordinates for the business based on the received address;
   determining, by the processing device, a parcel in which the business is located using the rooftop coordinates;
   obtaining, by the processing device, property boundary data for the determined parcel in which the business is located, the property boundary data including a parcel boundary definition for property on which the business is located;
   determining, by the processing device, a longest diagonal of a polygon formed by the parcel boundary definition for the property on which the business is located;
   creating, by the processing device, a circle, using the determined longest diagonal as a diameter, that is centered on the polygon formed by the parcel boundary definition; and
   registering, by the processing device, the circle as the geo-fence monitoring area for the business.

2. A system for determining a geo-fence monitoring area for a business, the system comprising:
   a processing device;
   a database accessible by the processing device, the database storing property boundary data for properties, the property boundary data including parcel boundary definitions for the properties,
   wherein the processing device is configured to receive an address for the business, obtain rooftop coordinates for the business based on the received address, determine a parcel in which the business is located using the rooftop coordinates, obtain from the database property boundary data for the determined parcel in which the business is located, the property boundary data including a parcel boundary definition for property on which the business is located;
   determine a longest diagonal of a polygon formed by the parcel boundary definition for the property on which the business is located;
   create a circle, using the determined longest diagonal as a diameter, that is centered on the polygon formed by the parcel boundary definition; and
   register the circle as the geo-fence monitoring area for the business.

3. The method of claim 1, further comprising:
   determining, by the processing device, that a user's mobile device has entered into the geo-fence monitoring area for the business;
   obtaining, by the processing device, location coordinates of the user's mobile device;
   determining, by the processing device, if the location coordinates of the user's mobile device are within the polygon formed by the parcel boundary definition for the property on which the business is located; and
   providing a location-based service to the user's mobile device only if the location coordinates of the user's mobile device are within the polygon formed by the parcel boundary definition for the property on which the business is located.

\* \* \* \* \*